Oct. 3, 1933.  O. EPPENSTEIN  1,928,662
BINOCULAR RANGEFINDER
Filed Feb. 17, 1932
Fig. 1.
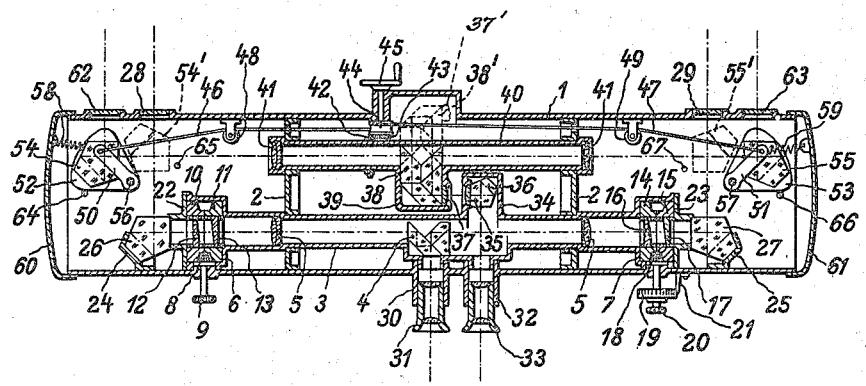
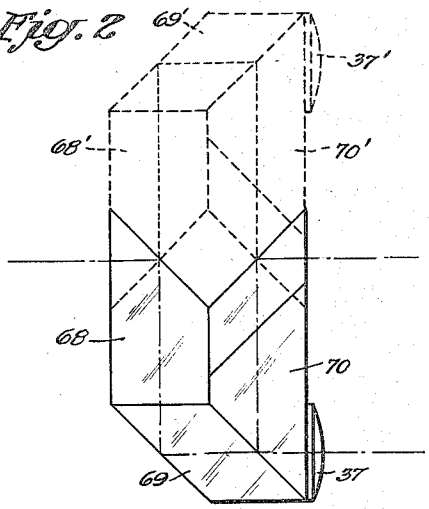
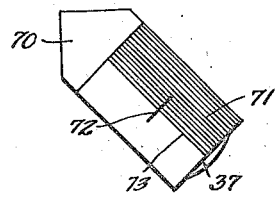
Fig. 2.  Fig. 3.
Inventor:
Otto Eppenstein Patented Oct. 3, 1933

1,928,662

UNITED STATES PATENT OFFICE 1,928,662

BINOCULAR RANGEFINDER

Otto Eppenstein, Jena, Germany, assignor to firm: Carl Zeiss, Jena, Germany

Application February 17, 1932, Serial No. 593,601, and in Germany March 3, 1931

4 Claims. (Cl. 88—2.7)

The invention concerns a binocular rangefinder consisting of two monocular double telescopes the reciprocal arrangement of which provides two operative positions. In one of these two positions, the measuring position, the observer is presented simultaneously the view of an orthostereoscopic and a pseudostereoscopic image of the object to be measured, the apparent difference of the distances of these two stereoscopic images allowing to be altered by means of an adjusting device. In the other of the said two positions, the test position, rays entering the image combining prism system from the ocular end of the one double telescope are directed by the objective reflecting systems of this double telescope to the reflecting systems of the other double telescope. Telemeters of this kind known so far are so constructed that in each of the two double telescopes the two objective reflecting systems are provided in a common prism bearing tube. The purpose of this prism bearing tube, which also may be the housing of the double telescope or a special tube provided in this housing, is to maintain the reciprocal positions of the objective prism systems, regardless of any exterior influences. This object is accomplished by a prism tube only when its diameter is in a definite proportion with the base length of the instrument. For instance, the prism tubes of telemeters having a great base, e. g. telemeters of the kind frequently used on board ship, require diameters which, for neutralizing the influence of the oscillations caused by the ship's engine, are substantially greater than those necessary for the light pencils which the tubes have to pass. In the measuring direction, an instrument of the kind mentioned hereinbefore consequently has a dimension greater than twice the diameter of the prism tubes.

The invention overcomes this disadvantage and, without decreasing the efficiency, allows the instrument to be given in the measuring direction a much inferior size by mounting the objective reflecting systems of one double telescope rigidly and those of the other double telescope movably in a common prism bearing tube. It is of special advantage to make the movably mounted objective reflecting systems rotatable about axes approximately at right angles to the measuring plane. Of course it is also possible to provide for the objective reflecting systems rotations about axes lying in the measuring plane, for instance about axes parallel to the base. However, in this case they must be imparted an additional displacement in order to provide that the movable objective reflecting systems, which, when in test position, have their light entrance surfaces opposite those of the fixed objective reflecting systems, do not, when in measuring position, obstruct the passage of the rays that are to enter the fixed objective reflecting systems, which means that the movable objective reflecting systems would be required to effect a helical movement. When providing axes of rotation that are perpendicular to the measuring plane, a single rotation is of the same effect as the less simple helical movement which, moreover, would require a more precise limitation of the movement owing to its greater sensibility with respect to deviations.

The two movable objective reflecting systems being always used simultaneously in the operative positions corresponding to each other, manipulating the instrument is especially simple when these objective reflecting systems are so coupled to each other that turning one of them into one of the operative positions entails a rotation of the other system into the corresponding operative position. In order to have all optical parts of the double telescope equipped with the movable objective prism systems assume in both operative positions equal positions relative to the direction of the entering light rays, it is necessary to turn these parts by 180° when making a transition from one operative position to the other, and this about an axis which is either perpendicular to the measuring plane or parallel to the base. The latter position is to be given the preference because it permits a more simple construction of the instrument, and it is advisable to so couple the movably mounted objective reflecting systems with the appertaining objectives and the image combining system that moving the objective reflecting systems from one operative position into the other causes half a revolution of these objectives and the image combining system about an axis parallel to the base of the double telescope.

Figure 1 of the accompanying drawing represents in a central section the plan view of the constructional example of a rangefinder according to the invention. Figure 2 illustrates a single element of the example on an enlarged scale. Figure 3 represents a prism forming part of this element, this prism being viewed in the direction of the arrow in Figure 2.

The constructional example has a tubular housing 1 in which two double telescopes are mounted by means of two supports 2. One of these double telescopes has a tube 3 containing an image combining prism system 4 and two objectives 5. The ends 6 and 7 of the tube 3 are enlarged and serve as bearings for one pair of turning wedges each. In the bearing 6 a pair of bevel wheels 10, 11 are reversely rotatable by means of a bevel wheel 8 and a milled head 9. The bevel wheels 10 and 11 contain glass wedges 12 and 13, respectively. In the bearing 7 two bevel wheels 14, 15 containing glass wedges 16, 17 are reversely rotatable and a bevel wheel 18 provided with a graduated disc 19 and a milled head 20 meshes with the bevel wheels 14 and 15. An index 21 fixed to the housing 1 belongs to the graduated disc 19. The bearings 6 and 7 are closed by means of lids 22 and 23. In front of these lids 22 and 23 are provided prism supports 24 and 25, respectively, resting against the housing 1 and holding angular reflecting prisms 26 and 27, respectively, coordinated to windows 28 and 29, respectively, in the housing 1. The described doubled telescope is completed by a two-lens ocular 31 adjustable in a tube 30 of the housing 1. In addition to the ocular 31 there is provided another ocular 33. This ocular 33 is disposed in the tube 32 of the housing 1, opposite a recess 34. The recess 34 contains an angular reflecting prism 36 provided with a converging lens 35. This converging lens 35 corresponds to another converging lens 37 which is cemented to an image combining prism system 38 in a recess 39 in a tube 40. The prism system 38 consists of three prisms 68, 69, and 70 cemented together. As shown in Figure 3, half of that surface of the prism 70 which is cemented to the prism 69 has a reflecting layer 71 and a straight line 72 transverse to the edge 73 of this layer 71. The tube 40 is rotatably mounted on the supports 2 and contains two objectives 41. On the tube 40 is fixed a bevel wheel rim 42 meshing with a bevel wheel 43. This bevel wheel 43, together with a drum 44, can be rotated by means of a hand wheel 45. The drum 44 is connected to two traction organs 46, 47 leading over rollers 48, 49 to levers 50, 51 fixed to prism supports 52 and 53, respectively. The prism supports 52, 53 contain angular reflecting prisms 54 and 55, respectively; They are rotatable about axes 56 and 57, respectively, which are provided in the housing 1 in such a manner that they are perpendicular to the measuring plane of the instrument. This rotation which is reverse to the action of springs 58, 59 is effected by means of the traction organs 46 and 47. The springs 58, 59 are fixed to covers 60 and 61, respectively, of the housing 1. Windows 62, 63 in the housing 1 are coordinated to the prisms 54, 55. The angle of rotation of the prism supports 52, 53 is restricted to 90° by means of stops 64, 65 and 66, 67, respectively, provided in the housing 1. As can be seen from the above description, the housing 1 of the instrument is a prism bearing tube not only for the fixed prisms 26 and 27 but also for the movable prisms 54 and 55.

The position of the parts of the second double telescope, as represented in the drawing, is the measuring position. The manner in which the instrument is to be used in its measuring as well as in its test position is already known. To enable a transition to be made from the measuring position, which is shown in the drawing, in which the prism supports 52 and 53 are in contact with the stops 64 and 66 owing to the influence of the springs 58 and 59, to the test position, the hand wheel 45 is to be turned until the prism supports 52 and 53, after a quarter of a revolution about their axes 56 and 57, touch the stops 65 and 67, when the angular reflecting prisms 54 and 55 assume the positions 54' and 55' indicated by dash lines. While the traction organs 46 and 47 are caused by the said revolution to coil up on the drum 44, the bevel wheel 43 transmits the rotation to the bevel wheel rim 42 and, consequently, to the tube 40. The objectives 41 consequently rotate about their optical axis without altering their positions, and the image combining system 38 assumes the position 38' indicated by dash lines. Figure 2 illustrates in dash-lines the positions 68', 69', and 70' of the prisms 68, 69, and 70, respectively, and the position 37' of the lens 37, this figure representing three positions which the said parts assume when the image-combining system 38 has been rotated to 38'. The bevel wheels 44, 42 must be given such a ratio of transmission that the tube 40 effects half a revolution when the prism supports 52, 53 are made to travel from the stops 64, 66 to the stops 65, 67. When the second telescope is in measuring position the imaging rays entering through the windows 62 and 63 are deviated by the prisms 54 and 55 to the objectives 41 and by the prism system 38, the lenses 37 and 35 and the prism 36 to the ocular 33. Furthermore the imaging rays entering through the windows 28 and 29 are deviated by the prisms 26 and 27 to the objectives 5 and consequently by way of the prism system 4 to the ocular 31. In the test position of the instrument, rays coming from the ocular 31 are directed through the objective 5 and the prisms 26, 27 of one double telescope and through the prisms 54, 55 and the objective 41 of the other telescope to that surface of the prism 70 which bears the line 72, both parts of this surface being illuminated. The upper and lower halves of the surface are imaged in the field of view of the ocular 31, respectively, by the optical elements 41, 55, 27, 5, which the imaging rays traverse in reverse direction, in the right part, and by the optical elements 41, 54, 26, 5 in the left part of the instrument. The rangefinder is in order when the wedges 16 and 17 assume reciprocal positions in which the index 21 points on the graduated disc to "infinity" and when, at the same time, the two partial images of the line 72, which are visible in the ocular 31, touch each other in the separation line 73 of the image-combining prism system 4. When these two partial images do not touch each other, they are made to do so by means of the adjusting device, that is to say by turning the milled head 9 and, consequently, the wedges 12 and 13. When making a transition from the test position to the measuring position, the hand wheel 45 is to be turned in the reverse sense, the consequence being that the tube 40 is turned back and the traction organs 46, 47 decrease in tension, thus permitting the springs 58, 59 to draw the prism supports 52, 53 back to the stops 64, 66.

I claim:

1. A binocular rangefinder comprising two monocular double telescopes, each of these double telescopes containing two objective reflecting systems, two objective lenses, an image combining prism system and an ocular, the two oculars being provided next to each other in the interpupillary distance, the rangefinder presenting the observer an orthostereoscopic and a pseudo-stereoscopic image of the object to be measured, an adjusting device comprising optical elements displaceably disposed in the path of the rays and adapted to alter the relative positions of the two stereoscopic images, the optical elements of the two double telescopes being tiltably disposed so as to be capable of being tilted into such relative positions that rays entering the image combining system of one double telescope and emerging from the objectives are directed by the objective reflecting systems of this double telescope to those of the other double telescope, and a prism bearing tube, the objective reflecting systems of one telescope being rigidly and those of the other being movably mounted in this prism tube.

2. A binocular rangefinder comprising two monocular double telescopes, each of these double telescopes containig two objective reflecting systems, two objective lenses, an image combining prism system and an ocular, the two oculars being provided next to each other in the interpupillary distance, the rangefinder presenting the observer an orthostereoscopic and a pseudo-stereoscopic image of the object to be measured, an adjusting device comprising optical elements displaceably disposed in the path of the rays and adapted to alter the relative positions of the two stereoscopic images, the optical elements of the two double telescopes being tiltably disposed so as to be capable of being tilted into such relative positions that rays entering the image combining system of one double telescope and emerging from the objectives are directed by the objective reflecting systems of this double telescope to those of the other double telescope, and a prism bearing tube, the objective reflecting systems of one telescope being rigidly and those of the other being movably mounted in this prism bearing tube in such a manner that they are rotatable about axes approximately at right angles to the measuring plane of the rangefinder.

3. In a binocular rangefinder according to claim 2, coupling means being provided between the two movable objective reflecting systems, these coupling means causing a rotation of both objective reflecting systems when one of these systems is turned.

4. In a binocular rangefinder according to claim 2, coupling means being provided between two movable objective reflecting systems, the objectives and the image combining system of the appertaining double telescope, these coupling means causing a rotation of the objectives and the image combining prism system about an axis parallel to the base of the rangefinder when the objective reflecting systems are turned.

OTTO EPPENSTEIN.